Jan. 31, 1950     L. DUBIN     2,495,710
RADIO BEACON RECEIVER CONTROL CIRCUIT

Filed March 9, 1946     2 Sheets-Sheet 1

INVENTOR.
LESTER DUBIN

BY

*R. P. Morris*

ATTORNEY

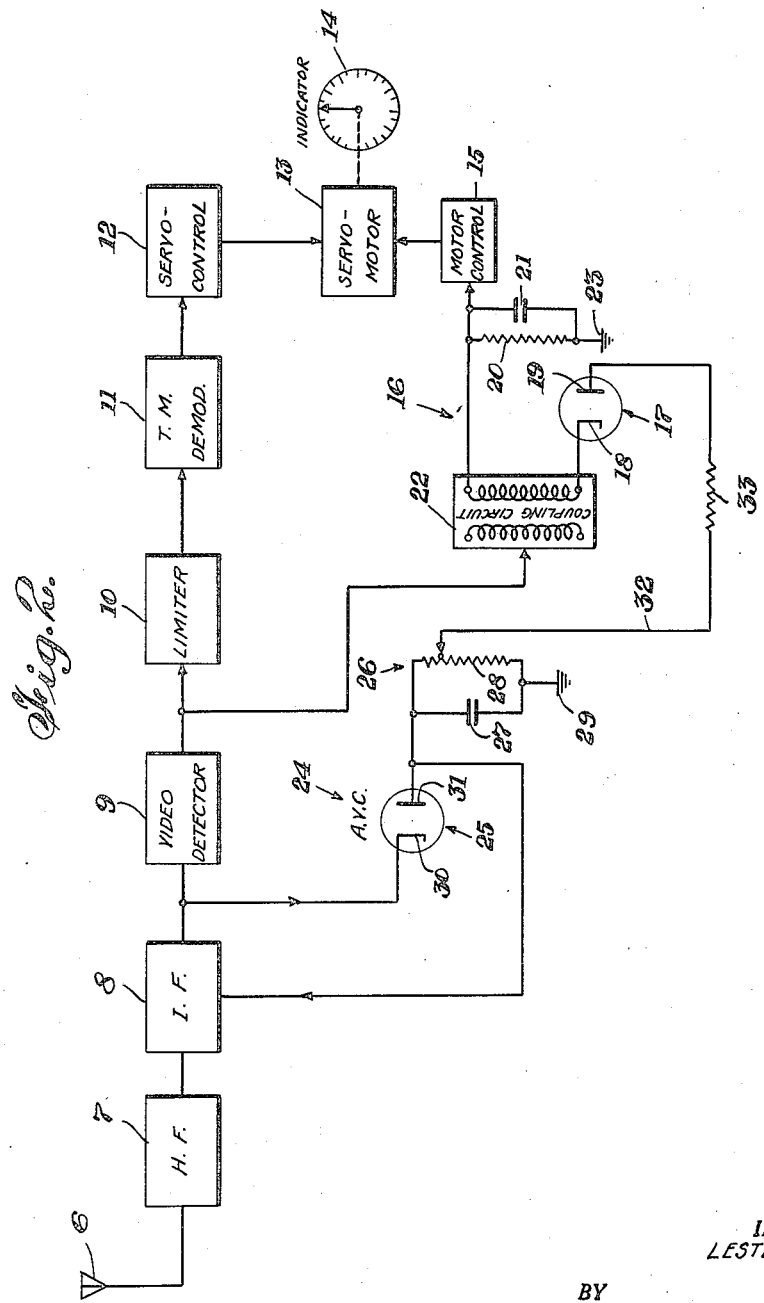

Patented Jan. 31, 1950

2,495,710

UNITED STATES PATENT OFFICE 2,495,710

RADIO BEACON RECEIVER CONTROL
CIRCUIT

Lester Dubin, Mount Vernon, N. Y., assignor to
Federal Telephone and Radio Corporation, New
York, N. Y., a corporation of Delaware Application March 9, 1946, Serial No. 653,264

10 Claims. (Cl. 343—106)

This invention relates to indications of radio beam energy such as used in radio beacons and more particularly to circuits for improving the indications obtained from rotary radio beacons of the omni-directional type.

Systems have been proposed for providing beacon signals transmitted from the ground which will serve to guide an aircraft on a substantially straight line to a fixed location, regardless of the direction of approach. These beacons generally provide signal indications which will give the pilot of the craft a given signal when he is in a predetermined direction from the station and different signals at different azimuthal locations about the station. For this purpose, different characteristics of the transmitted energy have been proposed. For example, in some proposed systems, the characteristics of the carrier are varied, such as for example, the frequency modulation of the carrier, or varying the phase or amplitude of the modulation, or varying the relative phase, frequency, or amplitude of one modulation frequency with respect to another modulation frequency. The receiver in the craft has means for identifying the particular characteristic of the transmission and thereby determining the direction of the craft from the beacon.

One of the difficulties inherent in all such beam systems is that caused by the width of the beam. Beams frequently vary in width from 20° to as much as 60°. When the receiver and beam by relative motion pass each other, as when the beam of the beacon station rotates, the leading edge of the beam will first strike an aircraft. At this instant the transmitted energy will have given signal characteristics indicating a given azimuth. As the beam continues to rotate past the aircraft, these signal characteristics are varied so that by the time the trailing edge of the beam departs from the aircraft, an entirely different set of characteristics producing an indication of an azimuth which may be as much as 20° to 60° from the first azimuth, is introduced. The pilot, therefore, receives an indication on his receiver which varies by 20° to 60°. It is therefore difficult for the pilot to know his true direction from the beacon.

An object of the present invention is the provision of an improved receiver for a rotary radio beacon.

Another object of the present invention is the provision of a receiver for a rotary radio beacon, of the type described, in which the indefiniteness, due to beam width, is substantially eliminated.

Still another object is the provision of a receiver of the type described in which azimuth indications are corrected for the width of the beam by making use of the beam characteristics in respect to the position of the tip of the beam.

A further object is the provision in a rotary radio beacon receiver of a system which makes use of the beam tip characteristic to perform a switching operation in respect to an indicating system associated therewith.

In accordance with the invention, means are provided in a receiver for such systems to produce indications of the presence and characteristic of a rotary radio beam. These indications may be obtained by means of so-called servo-motor indicating systems or by means of direct indications. The change in sign of the variation and field strength as the peak of the beam passes over the receiver is taken advantage of in causing a switching or triggering effect which controls the operation of the servo-motor or in the case of the direct indicating system acts to connect the signal channels and to disconnect them again after a short interval. In accordance with one of the features of the invention an automatic volume control is made use of to provide a control voltage which is made to fall below a critical value shortly after the field strength drops below a maximum corresponding to the peak of the beam whereby the operation of the indicator circuits is affected accordingly.

The foregoing and other features and objects will become more clearly apparent and the invention itself best understood from the following detailed description of an embodiment of this invention, reference being had to the accompanying drawings, in which:

Fig. 2 is a diagrammatic representation of a receiver embodying my invention;

Figure 1:
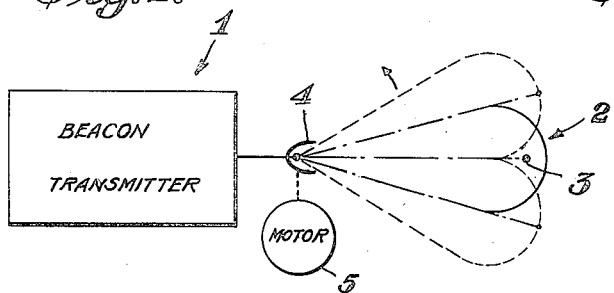
Fig. 1 is a diagram partly in block form of a rotary radio beacon.

Referring now to Fig. 1, a rotary radio beacon station generally designated by the numeral 1 produces a counter-clockwise rotating beam 2 having characteristics which vary with azimuth and are utilized to notify a plane at 3 of its direction in respect to its beacon. The beacon 1 may be of the type in which an audio frequency modulates the carrier frequency, the audio frequency being continuously varied as the beam is rotated as by a unidirectional antenna 4 which is rotated by means of a motor 5. Various known mechanical and electrical means for controlling the beacon may be utilized instead of the illustrated arrangement here described. The beam is illustrated in three possible rotative positions in respect to the plane at 3.

Referring now to Fig. 2 the receiver illustrated which may be mounted in an aircraft includes a suitable omni-directional antenna 6 feeding into radio frequency and thence into intermediate frequency stages 7 and 8 respectively. The intermediate frequency is then fed into a circuit 9 where it is detected. The output of the detector 9 is passed through a limiter 10 which prevents any signal issuing therefrom until it has reached an amplitude over a given limit. Thus, when the leading edge of the beam approaches the craft no signal will be given out by the limiter until a given field strength has been attained, that is a point sufficiently close to the peak or tip of the beam is being received and produces a signal in the output of the circuit. Since the signal received is in the form of pulses which are sent out with a varying frequency, the output of the limiter 10, in the form of pulses, is subjected to the action of a demodulator circuit 11 to obtain an amplitude modulated direct current voltage. The amplitude modulated voltage is a dirct function of frequency and therefore of direction. The voltage, thus obtained, applied over a suitable servo-motor control 12, serves to effect a rotation of a servo-motor system at 13 which in turn, operates a rotary indicator 14. The deflection of the indicator 14 as a function of the voltage obtained from demodulator 11 will, as soon as signals are passed by limiter 11, indicate the corresponding frequency, that is the direction. Since many variations of servo-motor-indicator combination systems are known which may serve the purpose, no further description of such systems will be given here. The servo-motor system 13 is controlled through a voltage relay or the like as at 15 which receives an actuating control voltage from a diode rectifier circuit 16. The circuit 16 includes a diode 17 comprising a cathode 18 and an anode 19, and a time constant circuit comprised of a resistance 20 and a condenser 21 which are characterized by a comparatively short charge and discharge period. The diode 17 is rendered conductive as the potential difference between its anode and cathode becomes sufficient to permit such conductivity. The potential on the cathode 18 is derived from the detected signals between circuits 9 and 10, any variation in the signal due to the passage of the beam being linearly reflected in the cathode voltage through a coupling circuit 22 and substantially reproduced in respect to its characteristic due to the short time constant of circuit 20—21 which provides a path to ground at 23 from the cathode 18. The potential for the anode 19 is derived from an automatic volume control circuit 24 which also includes a diode rectifier 25 and a time constant circuit 26 comprised of a condenser 27 and a resistance 28, the time constant circuit being grounded at 29. The resultant anode voltage follows the field pattern although at a somewhat slower rate. The time constant 26, however, has been chosen such as to provide a fast charge and a comparatively slow discharge period. The diode 25 includes a cathode 30 and an anode 31, the anode feeding into the time constant circuit 26 and the cathode 30 being energized from the output side of the intermediate frequency circuit 8. The rectified intermediate frequency current is returned into the intermediate frequency stage 8 from the anode 31 to provide an automatic volume control action. In view of the time constant circuit 26, a rising bias is provided for the intermediate frequency stages until the peak of the beam has been reached when such bias will become constant, leaving the receiver during the second half of the beam at constant gain. At the same time the voltage available in the time constant circuit 26 is used in part to provide a negative biasing potential for the anode 19 of the diode 17 over a connection 32 and a resistor 33. The connection 32 connects to the resistance 28 in such a way as to "take-off" a major fraction of the available voltage which may vary from 60 up to 95% of the total voltage.

Figure 3:
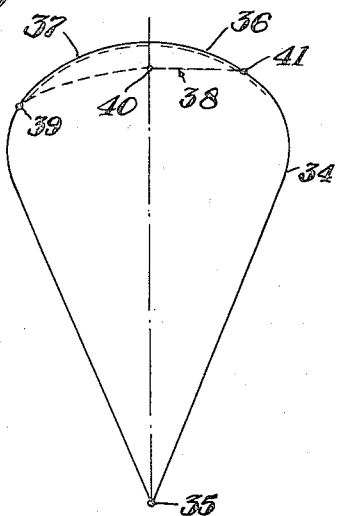
Fig. 3 is a graphical illustration of certain operating conditions in the circuit of Fig. 2.

Referring now to Fig. 3, a beam field pattern is indicated by the solid line at 34, the point of origin or the antenna being assumed to be at 35. This pattern is for illustration only, the actual pattern being quite narrow. The tip or peak of the beam assumes in accordance with the field strength variation a substantially semi-circular form as at 36. The broken line 37 shown closely following the curve 36 is the effective field voltage in the time constant circuit 20—21 which is effective on the cathode 18 of the rectifier 17 because of the fast charge and fast discharge characteristic of the circuit 20—21. The broken line 38 which is seen to rise from a null point at 39 to a maximum at 40 which coincides with the occurrence of the tip or peak of the beam and thence remains constant for the remainder of the beam in that plane until it intersects at 41 with the voltage characteristic 37. The point 41 in reality is much closer to 40 than shown. The characteristic 39, 40, 41 is the effective voltage available from the time constant circuit 26 because of its fast charge and slow discharge characteristics. The latter voltage is effectively below that available from the circuit 20—21 because of the pre-selected fractional point at which it is obtained across the resistance 28 in the connection 32. As the voltage characteristic 37 intersects with the voltage characteristic 38 and falls below it, the conductivity through the diode 17 ceases, whereby the control voltage as applied to the motor control circuit 15 disappears and the servo-motor stops. It will thus be seen a peak triggered automatic volume control is employed using a fast charge-slow discharge time constant which provides a bias which rises until the peak of the beam is reached and then remains constant to leave the receiver at constant gain during the second half of the beam. As already indicated, it is to be kept in mind that the pattern shown in Figure 3 is exaggerated and that the period between the center line of the beam and the point 41 is quite short due to the rapid falling off in field strength after the center of the beam has passed the receiver. Ordinarily, nearly the full bias developed by the A. V. C. circuit 24 is applied as a negative bias to the diode 17. The pulsating output of the detector 9 is used as the cathode bias. Thus, the applied bias and the applied pulse amplitude are proportioned so that up to substantially the beam peak the pulse amplitude somewhat exceeds the bias so that diode 17 conducts and thus develops a suitable control voltage. However, shortly after the field strength of the beam drops below the maximum corresponding to the peak of the beam, which in practice amounts only to a very short interval diode 17 ceases to conduct and the disappearance of the control voltage stops the servo-motor by means of a relay or a similar device.

Figure 4:
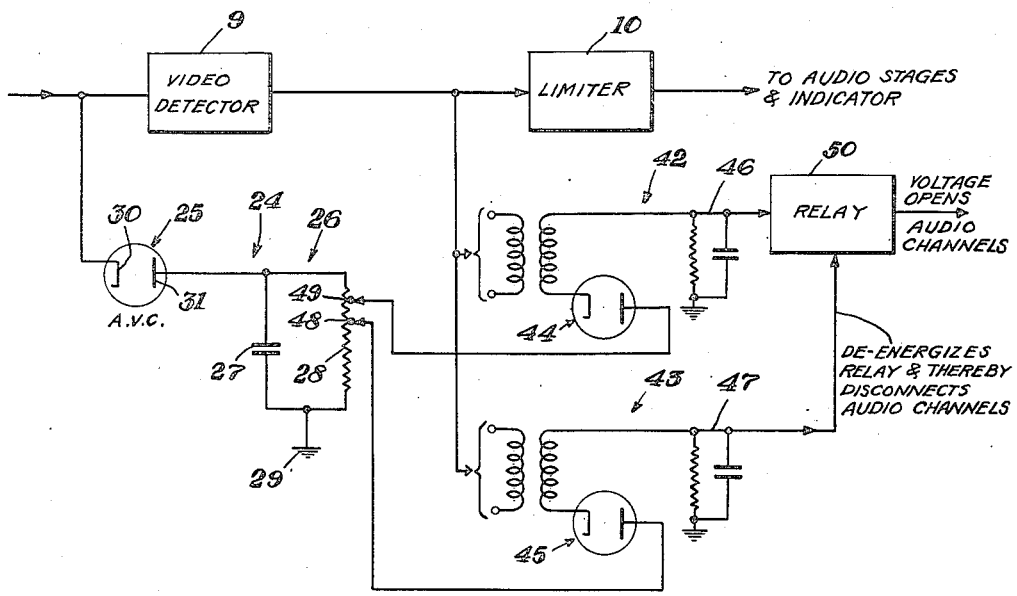
Fig. 4 is a diagram illustrating a modification of the circuit of Fig. 2.

In Fig. 4 a modification of the circuit of Fig. 1 is shown where direct reading methods are used instead of the servo-motor indicators as shown in Fig. 1. The main automatic control circuit and the main receiver circuit is similar to the one shown in Fig. 1 except that in this instance there are provided two short time constant circuits at 42 and 43 each including a diode 44 and 45, and a time constant circuit 46 and 47 respectively. The bias voltages to the respective anodes of the diodes 44 and 45 are obtained at slightly different values from the resistance 28 as at 48 and 49 so that one diode ceases to conduct a short time after the other diode, whereby an effective control voltage gate limiter is provided in respect to a control relay circuit 50 which may be a flip-flop circuit, to start and stop the operation thereof. The action of the control circuit 59 is effective in rendering operative the energization of suitable subsequent audio channels (not shown) for processing signals coming out of the limiter 10 which are used to provide direct indications as on a cathode ray tube.

In the present instance a time gating effect is obtained by using two diodes instead of the one diode 17 shown in Figure 2. The cathode bias of the tubes 44 and 45 is the same, while the two anode bias voltages differ by a small amount as determined by means of contacts 48 and 49 on the rheostat 28. Due to this difference of the two anode voltages the tube 44 will commence to conduct somewhat before the tube 45. The anode voltages of these two diodes will also vary somewhat differentially from one another although substantially following the outline of the pattern 36. The earlier conducting tube will thereby become effective in starting the operation of the relay 50 such as a flip-flop circuit while the lagging voltage of the anode of tube 45 will control the termination of the operative cycle of the relay 50.

In the systems as proposed above it is advantageous to make use of a limiter circuit for starting the operation of the whole at the beginning of each signal. The limiter when set at a suitable signal level will insure separation of minor lobes and further insures that if certain control voltages become zero during operation of the system the effect will be distinct from the condition of no signal, when these control voltages will also be zero.

While the above is a description of the principles of this invention in connection with specific apparatus, it is to be clearly understood that this description is made only by way of example and not as a limitation on the scope of this invention.

I claim:

1. In a receiver for a radio system of the type wherein signals are emitted in the form of a directional beam having substantially the field pattern of a symmetrical lobe having maximum amplitude at the line of symmetry thereof in which the signals have characteristics related to the direction of the beam: means for receiving signals as the lobe shifts angularly past the receiver including a detector; a beam direction indicator, rotary follow-up means responsive to the received signals for producing indications on said indicator in accordance with the said shift, and means responsive to voltage derived from signals occurring substantially along the line of symmetry of said beam to control the operability of said indicator.

2. In a receiver, the combination according to claim 1, wherein said last named responsive means includes a diode rectifier supplying a control voltage to said first named responsive means.

3. In a receiver, the combination according to claim 1, wherein said last named responsive means includes a diode rectifier having an anode and a cathode and means having a fast charge and slow discharge time constant for deriving a voltage from said signals for said anode and means having a fast time constant for driving a voltage from said signals for said cathode.

4. In a receiver, the combination according to claim 1, wherein said last named responsive means includes a diode rectifier having an anode and a cathode and adjustable means having a fast charge and slow discharge time constant for deriving a voltage from said signals for said anode and means having a fast time constant for deriving a voltage from said signals for said cathode.

5. In a receiver, the combination according to claim 1, further including means for passing only such signals from said detector as have at least a given amplitude.

6. For use with a radio beacon receiver, the circuit for controlling the operability of a beam direction indicator comprising a receiver, an indicator associated with said receiver, diode rectifier means having anode and cathode means for supplying a voltage to control the operation of said indicator, means deriving a voltage from signals in said receiver for said anode means, and means deriving a voltage from said signals for said cathode means, said anode voltage means including a diode rectifier deriving an operating voltage from signals in said receiver and a fast charge-slow discharge time constant circuit, and said cathode voltage means including means for obtaining a voltage from the signals in said receiver and a fast charge-fast discharge time constant circuit associated therewith.

7. A circuit according to claim 6 wherein said anode voltage means includes a diode rectifier deriving an operating voltage from signals in said receiver and a fast charge-slow discharge time constant circuit having an adjustable voltage output and said cathode voltage means includes means for obtaining a voltage from the signals in said receiver and a fast charge-fast discharge time constant circuit associated therewith.

8. A circuit according to claim 6, wherein said rectifier means includes two diode rectifiers, one each for supplying a starting and a stopping voltage for said indicator respectively.

9. A circuit according to claim 6, wherein said rectifier means includes two diode rectifiers, and said anode voltage means in common for said last named two diodes includes a diode rectifier deriving an operating voltage from the signals in said receiver and a fast charge-slow discharge time constant circuit, and said cathode voltage means includes common means for obtaining a voltage from said signals in the receiver and a fast charge-fast discharge time constant circuit associated with each of said two diodes.

10. A circuit according to claim 6, wherein said rectifier means includes two diode rectifiers, and said anode voltage means in common for said last named two diodes includes a diode rectifier deriving an operating voltage from the signals in said receiver and a fast charge-slow discharge time constant circuit, means for obtaining an upper and a lower voltage for said two diodes respectively, and said cathode voltage means includes common means for obtaining a voltage from said signals in the receiver and a fast charge-fast discharge time constant circuit associated with each of said two diodes.

LESTER DUBIN.

REFERENCES CITED

The following references are of record in the file of this patent:

UNITED STATES PATENTS

| Number | Name | Date |
|---|---|---|
| 1,983,079 | Hansen | Dec. 4, 1934 |
| 1,988,006 | Greig | Jan. 15, 1935 |
| 2,156,060 | Muller | Apr. 25, 1939 |
| 2,157,677 | Runge | May 9, 1939 |
| 2,184,843 | Kramar | Dec. 26, 1939 |
| 2,264,063 | Bond | Nov. 25, 1941 |
| 2,388,262 | Ganiayre et al. | Nov. 6, 1945 |
| 2,402,410 | Kear | June 18, 1946 |
| 2,404,501 | Kear | July 23, 1946 |
| 2,407,323 | O'Brien | Sept. 10, 1946 |
| 2,407,324 | O'Brien | Sept. 10, 1946 |
| 2,417,310 | Luck | Mar. 11, 1947 |